United States Patent [19]
Elks et al.

[11] 3,764,616
[45] Oct. 9, 1973

[54] 21-PHOSPHATE ESTERS OF 17α-ACYLOXY-21 HYDROXY STEROIDS OF THE PREGNANE SERIES

[75] Inventors: Joseph Elks, London; Peter John May, Harrow; Gordon Hanley Phillipps, Greenford, all of England

[73] Assignee: Glaxo Laboratories Limited, Greenford, Middlesex, England

[22] Filed: Oct. 14, 1969

[21] Appl. No.: 866,385

[30] Foreign Application Priority Data
Oct. 18, 1968 Great Britain.................. 48,643/68

[52] U.S. Cl............................ 260/397.45, 424/243
[51] Int. Cl............................................ C07c 169/30
[58] Field of Search................................ 260/397.45

[56] References Cited
UNITED STATES PATENTS

| | | | |
|---|---|---|---|
| 2,967,179 | 1/1961 | Arkley et al..................... | 260/239.5 |
| 3,312,590 | 4/1967 | Elks et al.............................. | 167/58 |
| 3,099,654 | 7/1963 | Joly et al....................... | 260/239.55 |
| 3,053,834 | 9/1962 | Fried............................. | 260/239.55 |
| 2,789,117 | 4/1957 | Sarett............................ | 260/397.45 |
| 3,073,816 | 1/1963 | Irmscher......................... | 260/239.5 |
| 3,064,016 | 11/1962 | Vermehren et al............ | 260/397.45 |

FOREIGN PATENTS OR APPLICATIONS

| | | | |
|---|---|---|---|
| 280,179 | 1/1965 | Australia........................ | 260/397.45 |
| 2,022,695 | 11/1970 | Germany........................ | 260/397.45 |
| 792,233 | 8/1968 | Canada.......................... | 260/397.45 |
| 1,365,253 | 5/1964 | France........................... | 260/397.45 |

OTHER PUBLICATIONS

Fried et al., Journ. Amer. Chem. Soc., Vol. 77, 8/55, pp. 4181–4182.

*Primary Examiner*—Lewis Gotts
*Assistant Examiner*—Ethel G. Love
*Attorney*—Bacon and Thomas

[57] ABSTRACT

This invention is concerned with novel 21-phosphate esters of 17α-acyloxy-21-hydroxy steroids of the pregane series and with methods of preparing such compounds. The compounds are useful as topical anti-inflamatory agents.

6 Claims, No Drawings

21-PHOSPHATE ESTERS OF 17α-ACYLOXY-21 HYDROXY STEROIDS OF THE PREGNANE SERIES

In British Patent Specification No.1,047,518 we have described and claimed certain 17α-monoesters of betamethasone and its 9α-chloro analogue, which compounds have considerably enhanced anti-inflammatory action following topical application as compared with other closely analogous compounds and/or the corresponding 17α,21-dihydroxy parent steroids. One such compound, namely betamethasone 17α-valerate has now been widely used in the topical treatment of inflammations.

The compounds described in our said specification are substantially insoluble in water and therefore their formulation into preparations suitable for otic and ophthalmic use presents problems. Since anti-inflammatory steroids are useful for local application for otic and ophthalmic purposes, water-soluble compounds having a high topical anti-inflammatory action are highly desirable.

We have now found that certain 21-phosphate esters related to the compounds described in our said specification form readily water-soluble salts, while at the same time exhibit high topical anti-inflammatory action. This combination of properties could not be predicted, since high topical anti-inflammatory action of 17α esters of betamethasone and its 9α-chloro analogue is restricted to only a certain class of such esters and is thought to depend at least in part upon the hydrophilic/lipophilic properties of the esters. Surprisingly solubilising by phosphorylation of the 21-hydroxy group still produces a compound of high topical anti-inflammatory action. Even more surprisingly the new compounds of this invention possess in general a better ratio of purely anti-inflammatory action to glucocorticoid action (as measured by thymolytic activity) than the compounds of our said prior specification, thereby reducing the risk of undesired systemic action should the compound be absorbed following topical application. The compounds according to the invention also possess useful internal anti-inflammatory action.

The compounds we have discovered according to this invention are represented by the general formula

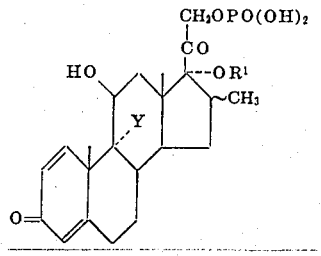

(in which $R^1$ represents an alkanoyl group containing two to five carbon atoms, a cycloalkanoyl group containing four, five, six or seven carbon atoms or a benzoyl group, and Y represents a fluorine or chlorine atom) and non-toxic water-soluble salts thereof. By the term "non-toxic" as applied to salts according to the invention we mean salts with cations which are physiologically acceptable for internal or topical administration. Such salts may be mono or dibasic salts.

Those compounds of formula I in which the 16-methyl group is in the β-configuration are preferred on account of their good anti-inflammatory activity.

Where the group $R^1$ in formula I is an alkanoyl group, such group preferably contains in general at least three carbon atoms.

The group $R^1$ may be a straight or branched chained alkanoyl group, in the latter case the isocompounds being preferred. Representative groups for $R^1$ thus include the acetyl, propionyl, butyryl, isobutyryl, valeryl and isovaleryl groups, the butyryl, isobutyryl, valeryl and isovaleryl groups being especially preferred. An example of a cycloalkanoyl group which $R^1$ may represent is a cyclopentane-carbonyl group.

The mono- and dibasic salts of the compounds of formula I are preferably alkali metal or ammonium salts such as the sodium or potassium salts. Particularly preferred salts according to the invention by virtue of their especially favourable degree of water-solubility are the disodium salts of the compounds of formula I.

The invention further comprises pharmaceutical compositions for human and veterinary practice, particularly for use in topical anti-inflammatory therapy, comprising at least one compound of formula I (as herein before defined) or non-toxic water-soluble salt thereof, together with one or more carriers, vehicles or excipients with or without additional therapeutic agents.

Examples of compositions for topical administration include ointments, lotions, creams, powders and aerosol sprays for application to the skin; suppositories and retention enemas for the surface treatment of rectal areas; vaginal inserts; sterile drops and ointments for eye and ear treatment; slowly dissolving buccal pellets e.g. for the treatment of aphthous ulcers; chewing gum providing a slow release of the medicament for the treatment of the mucous membranes of the mouth and throat; nose and throat sprays and applications.

Skin preparations may, for example, be formulated with compatible bases, for example in conventional manner, to suit the particular conditions required, such as hydrophobic ointments; non-aqueous hydrophilic ointments and creams; aqueous creams and lotions either as solutions, suspensions or emulsions, which may if desired contain thickening agents, humectants etc. Conventional excipients and formulating agents include for example, animal, vegetable and mineral oils and fats and oily esters e.g. lanolin and its derivatives, arachis oil, the paraffins, isopropyl myristate; non-ionic surfactants such as polysorbate 80 U.S.P. and polyethylene glycols; and humectants e.g. propylene glycol and sorbitol. Preservatives such as for example a chlorocresol and thiomersalate may also be included.

Powder preparations may, for example, contain the steroid in microfine form homogeneously dispersed in a powder base, e.g. mannitol or starch. Suitable propellents for aerosol sprays include dichlorodifluoromethane and trichlorofluoromethane.

Ointments and drops for eye and ear treatment are preferably formulated in unit dosage form in single dose capsules or small containers to avoid cross-infection. Aphthous ulcer pellets may be prepared with a hard smooth base containing for example, lactose and gelatine or gum tragacanth. Chicle gum with sugar and flavouring agents, is an example of a chewing gum base.

Nose and throat sprays may be prepared using aqueous or oily vehicles and may if desired contain a nasal decongestant such as phenylephrine.

Antibacterial agents, such as antibiotics e.g. aureomycin, neomycin, or chemical agents, such as, chiniofon may if desired be added to the steroid preparations detailed above for therapeutic advantage.

The proportion of active steroid in the topical compositions according to the invention will depend upon the precise nature of the formulation, but will generally be within the range of 0.0001 – 5 percent by weight, advantageously 0.001 –0.5 percent by weight and preferably 0.01 – 0.25 percent by weight.

The preparations may be administered once daily or more frequently dependent upon the nature of the condition being treated. Particularly beneficial results may be obtained in some cases by the use of occlusive dressings when the steroid is applied to the skin.

Veterinary preparations are in general, formulated in analogous manner to those mentioned above, but with suitable adaption made for dose and size of the animals concerned. The steroid compound according to the invention may also be useful in intramammary preparations.

Compositions according to the invention also include compositions for the systemic absorption of the active compounds, for example, oral and parenteral compositions. Since the compounds according to the invention are highly potent, unit dosage forms are generally preferred. Convenient unit dosage forms for internal administration include tablets and capsules and these may, if desired, be formulated to give a sustained release of the active material. Alternatively, readily soluble tablets may be prepared from the sodium salt of the steroid to provide a rapid action. For parenteral use, convenient unit dosage forms include ampoules and vials, the latter being either single or multiple dose containers. Suppositories for systemic absorption may be prepared, for example using a convenient suppository base in conjunction with a suitable carrier to aid absorption from the colon. e.g. sorbitan monostearate and cholesterol.

Compositions according to the invention for internal administration, may also include additional active ingredients such as antibacterial agents, e.g. neomycin; preservatives, such as benzalkonium chloride; suspending agents such as hydroxyethylcellulose and sorbitol; stabilising and buffering agents; surfactants etc. Excipients for solid preparations such as tablets may include sugar and sugar alcohols e.g. lactose and sorbitol; starch, and lubricants such as magnesium stearate or polyethylene glycol 6000. Liquid vehicles for compositions for oral administration may include aqueous or non-aqueous media such as edible oils which may be treated and flavoured. Sterile vehicles for parenteral use include water for injection B.P. or isotonic saline and non-aqueous vehicles such as non-toxic oils e.g. arachis oil and propylene glycol. Compositions for parenteral administration may also be prepared as sterile dry solids for reconstitution with a sterile diluent, immediately before use.

Preparations for systemic use in unit dosage form may contain from 0.05 to 2.0 mg, preferably 0.25 to 1.0 mg, of the active steroid per unit dosage. Generally the preparations for internal administration may contain from 0.01 to 50 percent of active ingredient, dependent on the type of preparation involved. In veterinary preparations, dosages vary considerably depending on the size of the animal and the frequency of administration of the composition.

The preparation of the phosphate esters in accordance with the invention has hitherto proved difficult and various conventional methods of phosphorylation applied to the parent 21-hydroxy compounds have given only small yields.

However we have found according to a further feature of the invention that, quite generally, 21-dihydrogen phosphates of 17α-acyloxy-20-keto-21-hydroxy steroid compounds and particularly such compounds of the pregnane and allopregnane series, may be prepared by reacting the parent 21-hydroxy steroid with phosphorus oxychloride, in the presence of a tertiary amine, and hydrolysing the resulting 21-dichlorophosphoryl compound to the desired ester or salt thereof.

This process is particularly useful for the preparation of 21-phosphate esters of 17α-acyloxy steroid compounds of the pregnane series possessing anti-inflammatory activity and containing in the steroid nucleus, substituents imparting such activity. Thus, anti-inflammatory compounds of the pregnane series are well-known to comprise a keto group at the 3-position, a double bond at the 4-position or 1- and 4-positions, either a keto group or a hydroxy group in the β-configuration at the 11-position and a keto group at the 20-position. As is well known other substituents may also be present which enhance or modify the physiological activity of the anti-inflammatory steroids e.g. a halogen atom, e.g. fluorine or chlorine, at the 9-position, an alkyl group, e.g. a methyl group, or a methylene group at the 16-position, the said alkyl group being in either the α- or β- configuration. Other substituents which may be present include methyl groups or fluorine atoms at position 2 and/or 6. The process is especially applicable to the preparation of the novel steroid compounds represented by formula I (as herein before defined).

It has been found that the use of an inert solvent, e.g. an ether, such as diethyl ether, tetrahydrofuran or dioxan, or a chlorinated hydrocarbon such as methylene chloride or chloroform, in the reaction of the 21-hydroxy steroid with the phosphorus oxychloride is especially advantageous.

The tertiary amine employed in the foregoing process is preferably pyridine, triethylamine, N-methyl morpholine, dimethylaniline etc. The phosphorus oxychloride is advantageously used in a molar excess based upon the steroid starting material, an excess of at least 3 and especially 4–5 molar equivalents being preferred. The tertiary amine is preferably present in at least an equimolar proportion, based upon the steroid starting material. Moreover, it has been found that the presence of a molar excess of tertiary amine is advantageous in the reaction of the phosphorous oxychloride and the 21- hydroxy steroid. The reaction is preferably effected at ambient temperatures or with slight cooling, for example at about –5°C. The resulting reaction mixture is generally hydrolysed to obtain the 21-dihydrogen phosphate, for example, by treating the reaction mixture with water, a large excess thereof being preferred.

The basic salts of the 21-dihydrogen phosphates of the 17α-acyloxy-20-keto-21-hydroxy compounds of the pregnane series may be prepared in conventional manner from the parent 21-dihydrogen phosphates e.g. by reaction with the corresponding base, e.g. an alkali metal hydroxide. However, the basic salts may alternatively be prepared directly from the dichlorophosphoryl ester (obtained by the reaction of the steroid starting material with phosphorus oxychloride) by conducting the hydrolysis thereof in the presence of the corresponding base.

The compounds of formula I (as hereinbefore defined) may also be prepared by reaction of the parent 21-hydroxy steroid with pyrophosphoryl chloride, followed by hydrolysis of the intermediate 21-dichlorophosphoryl steroid compound, either to the free phosphate ester or a salt thereof. The reaction of the parent steroid with pyrophosphoryl chloride is advantageously effected in a solvent medium such as for example tetrahydrofuran, dioxan, acetonitrile, aliphatic or aromatic hydrocarbons such as benzene, toluene or xylene; an excess of pyrophosphoryl chloride may also serve as the solvent. The reaction is conveniently effected at temperatures between $-50°C$ and $20°C$ e.g. at ambient temperature or with slight cooling, for example, at between $-10°$ and $0°C$. After completion of the reaction, the reaction mixture is hydrolysed by treatment with water preferably in excess and, if it is desired to produce a salt directly, in the presence of a basic compound such as sodium hydroxide, potassium hydroxide or lithium hydroxide.

Alternatively, the basic salts of the compounds of formula I may be prepared in conventional manner from the parent 21-dihydrogen phosphates, e.g. by reaction with the corresponding base, e.g. an alkali metal hydroxide.

For a better understanding of the invention, the following Examples are given by way of illustration only:

EXAMPLE 1

Betamethasone 17-isobutyrate 21-dihydrogen phosphate

A solution of 9α-fluoro-11β,21-dihydroxy-17-isobutyryloxy-16β-methylpregna-1,4-diene-3,20-dione (2.0 g.) in dry tetrahydrofuran (50 ml.) was added dropwise to a stirred solution of pyrophosphoryl chloride (1.27 ml.) in dry tetrahydrofuran (20 ml.) at 0° to $-5°C$. After 3 hours at 0° to $-5°C$ the reaction mixture was diluted with ice cold water (120 ml.) and the tetrahydrofuran evaporated in vacuo. The oily product which separated was extracted with ethyl acetate, washed with water and evaporated. The residue was dissolved in methanol (40 ml.) and water (30 ml.) and the pH adjusted to 9.0 by the addition of dilute sodium hydroxide solution. The basic solution was diluted with more water and washed with ethyl acetate and then acidified with 2N-hydrochloric acid to afford an oil which was extracted with ethyl acetate. Evaporation of the solvent in vacuo from the washed extract gave the crude product which was crystallized twice from aqueous methanol to afford betamethasone 17-isobutyrate 21-dihydrogen phosphate m.p. 167°-170°C, (Kofler), $[\alpha]_D+65.5°$ (C 1.0, dioxan) $\lambda_{max}$. 237 nm ($\epsilon$ 15,200) (Found: C, 55.7; H, 6.5; P, 5.5. $C_{26}H_{36}FO_9P$. 1 $H_2O$ requires C, 55.7; H, 6.8; P, 5.5%).

EXAMPLE 2

Betamethasone 17-valerate 21-dihydrogen phosphate.

Phosphorus oxychloride (40 g.) was added to a stirred solution of betamethasone 17-valerate (20 g.) in dry tetrahydrofuran (400 ml.) and the mixture cooled to between 0° and $-5°C$. Pyridine (3.4 ml.) was added and the temperature allowed to rise slowly over a period of 3.5 hours to room temperature. After a further 3 hours at room temperature the mixture was kept at 0°C overnight and then for another 3 hours at room temperature. Dilution with cold water (1 l.) and evaporation in vacuo of the tetrahydrofuran afforded an oil which was extracted with ethyl acetate. The washed extract was evaporated in vacuo and the residual oil dissolved in aqueous methanol and N-sodium hydroxide solution added to pH 9.0. The basic solution was washed with ethyl acetate, acidified with 2N-hydrochloric acid and the precipitated oil re-extracted into ethyl acetate. Evaporation of the solvent afforded the crude product which after two crystallizations from acetone yielded betamethasone 17-valerate 21-dihydrogen phosphate (12.42 g.) m.p. 160° – 163° (Kofler), $[\alpha]_D + 60.1$ (C 1.0 dioxan) $\lambda_{max}$. 238 nm ($\epsilon$ 16,200) (Found: C, 56.8; H, 7.0; P, 5.3. $C_{27}H_{38}FO_9P$. 1$H_2O$. 0.75 $CH_3.CO.CH_3$ requires C, 56.8; H, 7.3; P, 5.3%). The presence of water and 0.75 mole acetone was confirmed spectroscopically.

The finely ground betamethasone 17-valerate 21-dihydrogen phosphate (25.1 g.) was suspended in water (200 ml.) and stirred whilst N-sodium hydroxide solution was added until pH 9.0 was reached. The clear solution was filtered and freeze-dried to afford betamethasone 17-valerate 21-disodium phosphate $[\alpha]_D + 76.8°$ (c 1.0, dioxan) $\lambda_{max}$. 237 $\mu$m ($\epsilon$ 14,700) (Found: C, 49.5; H, 6.0. $C_{27}H_{36}FNaO_9P.3H_2O$ requires C, 49.5; H, 6.5%).

EXAMPLE 3

9α-Chloro-11β-hydroxy-17,21-(1'-isopropyl-1'-methoxymethylenedioxy)-16β-methylpregna-1,4-diene-3,20-dione A solution of 9α-chloro-16β-methyl-11β,17,21-trihydroxypregna-1,4-diene-3,20-dione (500 mg.) in dioxen (20 ml.) was treated with methyl orthoisobutyrate (1.0 ml.) and toluene p-sulphonic acid (25 mg.). After being kept at room temperature for about 30 minutes the reaction mixture was poured into dilute sodium bicarbonate solution containing a few drops of pyridine and extracted into ether. The extract was washed with water, dried (MgSO$_4$) and after the addition of a drop of pyridine, evaporated in vacuo. Trituration of the residue with cold ether gave the crude orthoester which was recrystallized from ether-acetone-petroleum ether to afford 9α-chloro-16β-methylprednisolone 17,21-methyl orthoisobutyrate m.p. 142°, $[\alpha]_D+102°$ (c 0.7, dioxan), $\lambda_{max}$. 239 $\mu$m ($\epsilon$ 15,500) (Found: C, 65.6; H, 7.5; Cl, 7.3. $C_{27}H_{37}ClO_6$ requires C, 65.8; H, 7.6; Cl, 7.2%).

b. 9α-Chloro-11β,21-dihydroxy-17-isobutyryloxy-16β-methylpregna-1,4-diene-3,20-dione Uncrystallized 9α-chloro-16β-methylprednisolone 17,21-methyl orthoisobutyrate (1.42 g.) in acetone (25 ml.) was treated with water (3 ml.) and 2N-sulphuric acid (0.3 ml.). After being kept at room temperature for 30 minutes the solution was poured into dilute sodium bicarbonate and the precipitated solid removed by filtration. This wet product was dissolved in chloroform, dried (MgSO$_4$) and the solvent removed in vacuo. Crystallization of the residue from acetone-petroleum ether afforded 9α-chloro-16β-methyl-prednisolone 17-isobutyrate m.p. 200°-210° decomp. $[\alpha]_D+ 106.5°$ (c 0.7 dioxan), $\lambda_{max}$. 238–239 $\mu$m ($\epsilon$15,300) (Found: C, 65.0; H, 7.2, Cl, 7.65. $C_{26}H_{35}ClO_6$ requires C, 65.2; H, 7.4; Cl, 7.4%).

c. 9α-Chloro-16β-methylprednisolone 17-isobutyrate 21-dihydrogen phosphate.

Pyrophosphoryl chloride (1.27 ml) in tetrahydrofuran (20 ml.) was stirred at −50°C whilst a solution of 9α-chloro-16β-methylprednisolone 17-isobutyrate (2.0 g.) in tetrahydrofuran (50 ml.) was added dropwise over a period of 15 minutes. The temperature was allowed to rise to −10°C and the reaction mixture was kept at this temperature for 4 hours. Dilution with water and evaporation of the tetrahydrofuran in vacuo gave an oil which crystallized on keeping at 0°C overnight. Filtration of this material and crystallization from aqueous methanol afforded 9α-chloro-16β-methylprednisolone 17-isobutyrate 21-dihydrogen phosphate (1.2 g.) m.p. 178°-181° decomp. (Kofler), $[\alpha]_D +90.0°$ (c 1.0, dioxan) $\lambda_{max.}$ 238 μm (ε 16,000) (Found: C, 52.6; H, 6.3; P, 5.0. $C_{26}H_{36}ClO_9P$. $2H_2O$ requires C, 52.5; H, 6.8; P, 5.2%).

EXAMPLE 4 a. Dexamethasone 17,21-methyl orthoisobutyrate.

A mixture of dexamethasone (4.0 g.), toluene p-sulphonic acid (304 mg.) and methyl orthoisobutyrate (9.0 ml.) in dioxan (200 ml.) was kept at room temperature for 4 days and finally heated for 30 minutes on a steam bath. Dilution with dilute sodium bicarbonate solution afforded the crude product which on crystallization from acetone-petroleum ether gave dexamethasone 17,21-methyl orthoisobutyrate m.p. 212°-219° (Kofler), $[\alpha]_D +43.8°$ (c 1.0 dioxan), $\lambda_{max.}$ 237 μm (ε 15,900) (Found: C, 67.7; H, 7.7.$C_{27}H_{37}FO_6$ requires C, 68.05; H, 7.8%).

b. Dexamethasone 17-siobutyrate

Water (17 ml.) and 2N-sulphuric acid (1.1 ml.) were added to a solution of dexamethasone 17,21-methyl orthoisobutyrate (4.35 g.) in acetone (170 ml.) and the mixture was kept at room temperature for 1.5 hours. About half of the solvent was evaporated in vacuo and the residue diluted with water to give the crude 17-ester. Recrystallisation from acetone-petroleum ether afforded dexamethasone 17-isobutyrate m.p. 225°-235° (kofler), $[\alpha]_D + 4.9°$ (c 1.3, dioxan), $\lambda_{max.}$ 238 nm (ε15,900), (Found: C, 67.4; H, 7.4; $C_{26}H_{35}FO_6$ requires C, 67.5; H, 7.6%.).

c. Dexamethasone 17-isobutyrate 21-dihydrogen phosphate . 9α-Fluoro-11β, 21-dihydroxy-17-isobutyryloxy-16α-methylpregna-1,4-diene-3,20-dione (2.0 g.) in tetrahydrofuran (50 ml.) was added over a period of 15 minutes to a solution of pyrophosphoryl chloride at −50°C. The temperature was allowed to rise to −10°C and was then kept constant for 3.5 hours. After dilution with cold water the tetrahydrofuran was removed in vacuo and the precipitated oil, which crystallized on standing, was removed by filtration. Recrystallization from aqueous methanol afforded dexamethasone 17-isobutyrate 21-dihydrogen phosphate (1.78 g; 76% Yield) m.p. 172°-175° decomp. (Kofler), $[\alpha]_D + 37.5°$ (c 1.0, dioxan), $\lambda_{max.}$ 238 nm (ε 16,700), (Found: C, 55.3; H, 6.7; P, 5.4. $C_{26}H_{36}FO_9P$. $H_2O$ requires C, 55.7; H, 6.8; P, 5.5%).

EXAMPLE 5

Prednisolone 17-propionate 21-dihydrogen phosphate.

Phosphorus oxychloride (1.8ml) and then pyridine (0.28 ml) was added to a stirred solution of prednisolone 17-propionate (1.5g.) in tetrahydrofuran (40 ml) at 0° − 5°C and the reaction mixture then allowed to come slowly to room temperature. After 6.5 hrs. the solution was poured into water, the tetrahydrofuran was removed in vacuo, and the crude product isolated by extraction with ethyl acetate. This material, in aqueous methanol, was titrated with 0.1 N-sodium hydroxide to pH 9.0 and the solution extracted with ethyl acetate. The aqueous solution was acidified to pH 1 with 2N-hydrochloric acid and then extracted with ethyl acetate to give prednisolone 17-propionate 21-dihydrogen phosphate as a froth (445 mg).

A portion (84 mg) of this material in methanol (10 ml) was converted to the dimethyl ester by treatment with ethereal diazomethane. The prednisolone 17-propionate 21- dimethyl phosphate, purified by preparative thin layer chromatography and crystallisation from acetone-petroleum ether, had m.p. 162°-166°C (Kofler), λ max 242 nm (ε 14,400). (Found: C,58.4; H, 7.0. $C_{26}H_{37}O_9P$. 0.5 $H_2O$ requires C, 58.5; H, 7.2%).

A further portion (268 mg) of the dihydrogen phosphate was dissolved in methanol (10 ml) and water (25 ml) and titrated to pH 9.0 with 0.1 N-sodium hydroxide solution. The clear solution was diluted with more water (100 ml) and freeze-dried to afford prednisolone 17-propionate 21-disodium phosphate (280 mg) λ max 242 nm (ε 14,150) (Found: C, 48.3; H, 5.6; P, 4.9. $C_{24}H_{31}Na_2O_9P$. $3H_2O$ requires C, 48.4; H, 6.3; P, 5.2%).

EXAMPLE 6

Betamethasone 17-acetate 21-dihydrogen phosphate.

A solution of betamethasone 17-acetate (2.0g) in tetrahydrofuran (70 ml) was added to a solution of pyrophosphoryl chloride (1.27 ml) in tetrahydrofuran (20 ml) at −5° to 0°C over a period of about 15 minutes. The temperature was kept between −5° and 0°C for 3 hours and then the solution was poured into water and the tetrahydrofuran evaporated in vacuo. The mixture was cooled for 1 hour and the crystalline dihydrogen phosphate (1.9 g: 80%) removed by filtration. Recrystallization from aqueous acetone afforded betamethasone 17-acetate 21-dihydrogen phosphate m.p. 192°-194°C (Kofler), $[\alpha]_D + 67.3°$(c 1.0 dioxan), λ max 238 nm (ε 15,400) (Found: C, 53.0 H, 6.4; P, 6.0. $C_{24}H_{32}FO_9P$. 1.5 $H_2O$ requires C, 53.2: H, 6.5: P 5.7%).

EXAMPLE 7

Betamethasone 17-propionate 21-dihydrogen phosphate.

Betamethasone 17-propionate (2.0 g) in tetrahydrofuran (90 ml) was added to a stirred solution of pyrophosphoryl chloride (1.27 ml) in tetrahydrofuran (20 ml) at −50°C. The temperature was allowed to rise slowly to −10°C where it was held for 5 hrs and then allowed to rise to −4°C for 18 hours. Dilution of the mixture with water and evaporation of the tetrahydrofuran in vacuo gave an oil which was extracted into ethyl acetate. Evaporation of the washed extract and two crystallisations of the residue from ethyl acetate afforded betamethasone 17-propionate 21-dihydrogen phosphate m.p. 171° − 173° (Kofler), $[\alpha]_D + 66.0°$(c 1.0, dioxan) (Found: C, 54.9: H, 6.2: P, 5.9 $C_{25}H_{34}FO_9P$. $H_2O$ requires C, 54.9: H, 6.6; P, 5.7%).

EXAMPLE 8

Betamethasone 17-butyrate 21-dihydrogen phosphate.

A solution of betamethasone 17-butyrate (4.0 g) in tetrahydrofuran (80 ml) was added with stirring to a solution of pyrophosphoryl chloride (2.55 ml) in tetrahydrofuran at −5° to 0°C. After 3 hours the solution was poured into water (200 ml) and the organic solvent removed in vacuo. The precipitated oil which solidified on standing was removed by filtration, dissolved in methanol (85 ml) and water (40 ml) and titrated with 0.1N-sodium hydroxide to pH 9.0. Neutral material was removed by extraction with ethyl acetate and the aqueous layer acidified with 2N-hydrochloric acid to pH 1. Traces of ethyl acetate were removed in vacuo and the crystalline dihydrogen phosphate (3.71 g) removed by filtration. Recrystallisation from isopropyl ether-methanol afforded betamethasone 17-butyrate 21-dihydrogen phosphate m.p. 173°- 177°C. (Kofler), $[\alpha]_D + 65.5°$ ($c$ 1.0 dioxan) $\lambda$ max 238 nm ($\epsilon$ 15,800) (Found: C 55.0; H, 6.6; P, 5.1. $C_{28}H_{36}FO_9P$. 1.5 $H_2O$ requires C, 54.8: H, 6.9; P, 5.4%).

A portion of the dihydrogen phosphate (1g) was suspended in water and slowly titrated with 0.1N-sodium hydroxide solution to pH 9.0. The resulting solution was freeze-dried and the product crystallised from aqueous acetone to afford betamethasone 17-butyrate 21-disodium phosphate $[\alpha]_D + 54.0°$ ($c$ 1.0 $CHCl_3$).

EXAMPLE 9

Betamethasone 17-benzoate 21-dihydrogen phosphate

Phosphorus oxychloride (1.6g.) was added to a solution of betamethasone 17-benzoate (801 mg.) in dry tetrahydrofuran and the mixture cooled in an ice-salt bath. Pyridine (0.13 ml.) was added and the temperature was allowed to rise slowly to room temperature. When the reaction was judged complete (thin layer chromatography) the reaction mixture was poured into water and the tetrahydrofuran evaporated in vacuo. The oily material which became solid on trituration was removed by filtration. This pale yellow solid was suspended in aqueous methanol and 0.1N-sodium hydroxide solution added to pH 9.0. The aqueous solution was extracted with ethyl acetate and then acidified with dilute hydrochloric acid and the precipitated material extracted with ethyl acetate. Evaporation in vacuo of the solvent afforded an oil which was recrystallized from a large volume of ether to give betamethasone 17-benzoate 21-dihydrogen phosphate. m.p. 187°-190°C (Kofler), $[\alpha]_D + 49.8°$ ($c$ 0.7 dioxan).

The following examples illustrate the preparation of pharmaceutical compositions according to the invention.

EXAMPLE (a)

Hydrophobic ointment
1. Betamethasone 17-valerate 21-dihydrogen phosphate 0.1% $w/w$
2. Neomycin sulphate B.P. 0.5% $w/w$
3. Liquid paraffin B.P. 10% $w/w$
4. White soft paraffin B.P. to 100 parts by weight Ball mill component (1) to a particle size not exceeding 10 microns with a small quantity of heat-sterilised liquid paraffin, using the remainder of the liquid paraffin to rinse out the mill. Add the suspension to the previously sterilised component (4) warmed to a soft melt at about 37°C. and incorporate component (2) therein, stirring with a planetary mixer until the active ingredients are evenly distributed and the ointment thickens at about 30°C. Fill into sterilised tubes.

EXAMPLE (b)

Hydrophilic non-aqueous skin application

Betamethasone 17-valerate 21-dihydrogen phosphate 0.05% in equal parts of Macrogol Ointment B.P.C. and polyethylene glycol 1,500.

Triturate the finely divided active material with a little of the ointment base and gradually dilute with the remaining base to give even distribution.

EXAMPLE (c)

Aqueous Cream
Betamethasone 17-valerate 21-disodium phosphate 0.5% $w/w$
Cetostearyl alcohol B.P.C. 7.2% $w/w$
Cetomacrogol 1000 B.P.C. 1.8% $w/w$
Liquid paraffin 6.0% $w/w$
White soft paraffin 15.0% $w/w$
Chlorocresol 0.1% $w/w$
Distilled water to produce 100 parts by weight Dissolve the chlorocresol in 60 parts of heat- sterilised water at about 90°C. and cool to 65°C. Dissolve the active ingredient in the remaining 10 parts of cold sterilized water. Melt together the oily phase constituents to 90°C. and cool to 60°C. Add the oily phase to the chlorocresol solution, stirring rapidly until the emulsion cools and thickens at about 40°-45°C. Slowly incorporate the betamethasone 17-valerate 21-phosphate solution and continue to stir the mix at slow speed until the cream sets at about 30°C. Fill into sterilized pure tin tubes.

EXAMPLE (d)

Lotion
Betamethasone 17-valerate 21-disodium phosphate 0.05% $w/w$
Carbopol 934* (T.M.) 0.3% $w/w$
Diethanolamine approx. 0.5% $w/w$
Distilled water to produce 100 vols

*(*Carboxy vinyl polymers, supplied by B.F. Goodrich Chemical Co. through Honeywill and Stein Ltd, Devonshire House, Mayfair Place, London, W.1.

Disperse the Carbopol 934 in 90 volumes of water, heat to 80°C. for 10 mins. and allow to cool to room temperature. Add the diethanolamine slowly, while stirring until thickening occurs and the mix has a pH of 6.8 – 7.0. Dissolve the active ingredient in the remaining water, previously boiled and cooled, add to the lotion base and mix well.

EXAMPLE (e)

Aerosol spray
1. Betamethasone 17-valerate 21-disodium phosphate 5.0mg
2. Fractionated coconut oil to 1.20g.
3. Dichlorodifluoromethane 16.32g.
4. Trichlorofluoromethane 24.48g.

Ball mill component (1) with a small quantity of component (2) (both of which have previously been dried to constant weight in a desiccator), to a particle size of about 0.5 to 5 microns. Dilute the suspension with the remaining oil, mix well and distribute into suitable pressure containers. Add the propellants in a conventional manner and check the filled weight and actuator.

EXAMPLE (f)

Retention enema
Betamethasone 17-valerate 21-disodium phosphate 0.001% $w/w$
Nipastat*T.M. 0.10% $w/v$ Distilled water to produce 100 volumes

*(*A mixture of methyl, ethyl, propyl and butyl esters of p-hydroxybenzoic acids from NIPA Laboratories Ltd; Treforest Trading Estate, near Cardiff, Wales.

Heat-sterilise the water and while still hot dissolve in it the Nipastat. Cool and add the active material and stir until dissolved. Distribute in quantities of 100 ml into conventional plastic bags for simple administration.

EXAMPLE (g)

Eye and Ear Drops

Betamethasone 17-valerate 21-disodium phosphate 0.025% w/v
Thiomersalate B.P. 0.005% w/v
Sodium chloride 0.6% w/v
Water for Injection B.P. to 100 vols.

Dissolve the solids in the water for injection; re-sterilise the solution by passage through a membrane filter and fill aseptically into small amber sterile vials provided with suitable eye droppers.

EXAMPLE (h)

Aphthous Ulcer Pellets

Betamethasone 17-valerate 21-dihydrogen phosphate 0.5mg.
Lactose 75.7mg.
Magnesium stearate 0.8mg.
Acacia 3.0mg.

Grind the active ingredient to a very small particle size of about 1–5 microns and gradually dilute with the lactose. Make a 25 percent solution of the acacia in water, heat to boiling and cool. Use this solution to granulate the powder mix, pass through a No. 12 mesh B.S. sieve and dry to constant weight in a vacuum oven at 45°C. Pass the dried granules through a No. 20 mesh B.S. sieve and blend in the magnesium stearate. Subject the granules to heavy compression with 7/32 inch bi-convex punches to form 80 mg pellets. Protect the tablets from moisture and light.

EXAMPLE (i)

Nose and Throat Spray

1. Betamethasone 17-valerate 21-disodium phosphate 0.01% w/v
2. Neomycin sulphate 0.5% w/v
3. Sodium chloride 0.5% w/v
4. Distilled water to produce 100 vols.

Sterilise the distilled water by heat, and when cool dissolve in it components (2) and (3). Adjust the pH to 6.8–7.0 using sodium hydroxide and to this solution add component (1) and stir to dissolve. Filter and fill into small, well filled plastic containers with adaptable spray or dropper nozzles. Protect from light.

EXAMPLE (j)

Oral tablet.

1. Betamethasone 17-valerate 21 dihydrogen phosphate 0.5mg.
2. Lactose B.P. 78.5mg.
3. Acacia Powder B.P. 5.0mg.
4. Maize starch 10.0mg.
5. Potato starch 5.0mg.
6. Magnesium stearate 1.0mg.

Reduce the particle size of component (1) to less than 10 microns in diameter and substantially to about 1 to 5 microns. Blend together components 2,3 and 5 and dilute component (1) with the mixture by trituration. Granulate the powders with component (4) as a 10 percent starch paste and pass the mass through a No. 12 mesh B.S. sieve. Dry the granules at 37°–40°C. to constant weight and sift through a No. 16 mesh B.S. sieve. Lubricate the granules with component (6) and compress on one-fourth inch diameter punches into 100mg. tablets. The tablets may be coated using a readily dispersible film coating.

We claim:

1. A compound of the formula

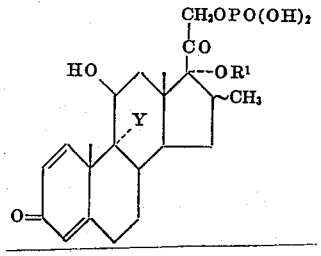

in which $R^1$ represents a grouping selected from the group consisting of alkanoyl groups containing two to five carbon atoms, cycloalkanoyl groups containing four, five, six and seven carbon atoms and a benzoyl group and Y represents a halogen selected from the group consisting of fluorine and chlorine; or a non-toxic water-soluble salt thereof.

2. A compound as claimed in claim 1 in which the 16-methyl group is in the $\beta$-configuration.

3. A compound as claimed in claim 1 in which Y represents fluorine.

4. A compound as claimed in claim 1 in which $R^1$ represents an alkanoyl group selected from the group consisting of butyryl, isobutyryl, valeryl and isovaleryl.

5. A compound as claimed in claim 1 selected from the group consisting of betamethasone 17-isobutyrate 21-dihydrogen phosphate; betamethasone 17-valerate 21-dihydrogen phosphate; 9$\alpha$-chloro- 16$\beta$-methylprednisolone 17-isobutyrate 21-dihydrogen phosphate; dexamethasone 17-isobutyrate 21-dihydrogen phosphate; betamethasone 17-acetate 21-dihydrogen phosphate; betamethasone 17-propionate 21-dihydrogen phosphate; betamethasone 17-butyrate 21-dihydrogen phosphate; betamethasone 17-benzoate 21-dihydrogen phosphate; and a non-toxic water-soluble salt thereof.

6. A compound as claimed in claim 1 in the form of its sodium or potassium salt.

PO-1050
(5/69)

UNITED STATES PATENT OFFICE
CERTIFICATE OF CORRECTION

Patent No. 3,764,616    Dated October 9, 1973

Inventor(s) Joseph Elks, Peter John May and Gordon Hanley Phillipps

It is certified that error appears in the above-identified patent and that said Letters Patent are hereby corrected as shown below:

On the Title Page, Column 1, line 12, "October 18, 1968" should read -- October 14, 1968 --.

Signed and sealed this 16th day of April 1974.

(SEAL)
Attest:

EDWARD M. FLETCHER, JR.
Attesting Officer

C. MARSHALL DANN
Commissioner of Patents